United States Patent
Grewal et al.

(10) Patent No.: US 7,222,131 B1
(45) Date of Patent: May 22, 2007

(54) SYSTEM AND METHODOLOGY FACILITATING DATA WAREHOUSING OF CONTROLLER IMAGES IN A DISTRIBUTED INDUSTRIAL CONTROLLER ENVIRONMENT

(75) Inventors: Ardaman S. Grewal, Greenfield, WI (US); Jeffery L. Hamilton, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 466 days.

(21) Appl. No.: 10/253,343

(22) Filed: Sep. 24, 2002

(51) Int. Cl.
*G06F 17/30* (2006.01)
*G06F 15/173* (2006.01)

(52) U.S. Cl. ............... 707/104.1; 707/203; 709/217; 717/168; 717/170

(58) Field of Classification Search ........... 707/104.1; 717/168, 170, 717, 172, 173
See application file for complete search history.

(56) References Cited

U.S. PATENT DOCUMENTS

| | | | |
|---|---|---|---|
| 4,558,413 A * | 12/1985 | Schmidt et al. | 707/203 |
| 5,155,847 A * | 10/1992 | Kirouac et al. | 709/221 |
| 5,564,049 A * | 10/1996 | Schmidt | 707/104.1 |
| 5,574,898 A * | 11/1996 | Leblang et al. | 707/1 |
| 5,835,911 A * | 11/1998 | Nakagawa et al. | 707/203 |
| 5,859,847 A * | 1/1999 | Dew et al. | 370/389 |
| 5,909,581 A * | 6/1999 | Park | 717/170 |
| 5,931,909 A * | 8/1999 | Taylor | 709/221 |
| 6,029,175 A * | 2/2000 | Chow et al. | 707/104.1 |
| 6,151,643 A * | 11/2000 | Cheng et al. | 710/36 |
| 6,199,204 B1 * | 3/2001 | Donohue | 717/178 |
| 6,223,343 B1 * | 4/2001 | Hopwood et al. | 717/101 |
| 6,256,773 B1 * | 7/2001 | Bowman-Amuah | 717/121 |
| 6,272,536 B1 * | 8/2001 | van Hoff et al. | 709/217 |
| 6,567,863 B1 * | 5/2003 | Lafuite et al. | 710/8 |
| 6,665,384 B2 * | 12/2003 | Daum et al. | 379/102.03 |
| 6,801,920 B1 * | 10/2004 | Wischinski | 707/203 |
| 6,813,571 B2 * | 11/2004 | Lightbody et al. | 702/62 |

(Continued)

OTHER PUBLICATIONS

Benage et al., "Building Enterprise Solutions with Visual Studio 6", 1999, Sams Publishing, pp. 1005, 10061015, 1017-1021.*

*Primary Examiner*—Etienne P. Leroux
*Assistant Examiner*—Hassan Tony Mahmoudi
(74) *Attorney, Agent, or Firm*—Amin Turocy & Calvin LLP; William R. Walbrun (57) ABSTRACT

The present invention relates to a system and methodology facilitating storage, access, and version control of PLC-based images. An object is provided that mediates access between a database server and an application that desires access to such images. Before access can be achieved, a login and authentication process for a user desiring access to the image database is performed, wherein users who are successfully authenticated can then save, retrieve, and affect changes to the images in a substantially secure manner while enforcing protection against invalid or improper changes to the images. The object is adapted to store the images as a complete or compiled version of the elements required to operate a PLC program. Since PLC images are different than standard data types that are typically stored, a check-sum procedure is performed on the image to determine if changes are made. If changes are made, a metadata file that is associated with the image can log relevant change information and bump an associated revision information for the image thus facilitating automated an orderly control over who, how, when, and where such revisions can be made.

27 Claims, 10 Drawing Sheets

U.S. PATENT DOCUMENTS

2002/0069282 A1* 6/2002 Reisman .................... 709/227
2002/0097851 A1* 7/2002 Daum et al. ........... 379/102.03
2002/0129352 A1* 9/2002 Brodersen et al. .......... 717/174
2002/0174422 A1* 11/2002 Kelley et al. ................ 717/178
2002/0198607 A1* 12/2002 Johnson et al. ............... 700/18
2002/0198920 A1* 12/2002 Resnick et al. ............. 709/100

* cited by examiner

SYSTEM AND METHODOLOGY FACILITATING DATA WAREHOUSING OF CONTROLLER IMAGES IN A DISTRIBUTED INDUSTRIAL CONTROLLER ENVIRONMENT

TECHNICAL FIELD

The present invention relates generally to industrial control systems, and more particularly to a system and methodology to facilitate data storage, retrieval, revision and access control of controller images to a server database within a networked industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet®, DeviceNet® or other network protocols (Foundation Fieldbus (H1 and Fast Ethernet) Modbus TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

As PLC's have evolved however, the associated logic programs have become ever more sophisticated and complex. In many cases, these programs include valuable intellectual property that must be protected from those who do not have appropriate credentials for accessing, removing, and/or modifying such programs. In addition, there may be safety concerns if programs are improperly modified by unauthorized personnel or modified at an inappropriate time (e.g., unpredictable machine operation caused by changed, added, conflicting or removed logic elements). Also, relating to these security concerns, the manner in which PLC program and data files are stored can be problematic. For example, common database servers and associated software are generally not adapted in an off-the-shelf manner to accommodate the types of images that are created and operated upon by a PLC. In one common database application, when changes are made to a stored file on the database, the changes are stored in a delta file which merely logs the changes in a separate file from a base file that has been previously stored. While the delta file may be useful for enabling reconstruction of the base file having the desired changes for such file types as text files, this technique is not suitable for images that drive PLC operations since PLC images are compiled and stored as an integrated whole.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide a database warehouse for storage of PLC images and to facilitate secure access to such images in a controlled manner. An Image Archive and Access (IAA) component cooperates with an application such as an image editor tool to limit access to the database to authorized users, wherein the database can include a commercially available database server such as a Structured Query Language (SQL) server. In one aspect, a login and authentication process can be initiated in accordance with the IAA component to determine if a user has valid rights to access the database. If the user is authenticated, a check-out procedure can be performed to retrieve a respective image from the database, wherein a tag associated with the image indicates that the image has been checked-out—thus preventing others from altering the image during check-out.

When the user has completed work on the image, a check-in procedure can be performed to return the altered image to the database. During check-in, a check-sum is performed on the checked-out image to determine if changes have occurred by comparing the check-sum to a previously stored check-sum for the respective image. If changes have occurred, a new image is then saved on the database having a different revision than the previously stored image in addition to storing associated metadata relating to the checked-in image. The metadata includes such information as who made the changes to the image, when were the image changes made, the current check-sum and what the current revision of the image is. As changes are made, the existing revision can be increased or bumped to indicate the latest working copy of the image. In this manner, PLC images can be managed in a secure environment while maintaining image revision or version control in accordance with desired PLC operations and programs.

In addition to storage, security, access, and version control of PLC images, the IAA component facilitates other features in accordance with the present invention. These can include sharing operations, wherein two or more respective images are tagged to indicate that if changes are made to one of the tagged images, the changes are then rippled or transferred to the associated tagged image on the database. Another operation can include branching operations wherein previously marked shared files are tagged or updated to indicate the files should now be treated as individual images and no longer should receive changes from the other shared image as changes are made.

Other image features include pinning and labeling procedures. Pinning enables users to indicate, tag, or mark an image as the current revision even though later or higher revisions of the image may exist. This can be advantageous when new or experimental software is developed from tested baseline code having a known revision yet leaving the baseline code intact. Labeling enables user's to supply their own revision mnemonic in place of numerically assigned system values. The user assigned labels are then mapped to the system assigned values whereby the user can then employ the label to access the desired image in a convenient manner—via the assigned label. Furthermore, the IAA component can be provided as a client-side object (or other type) that communicates with the database server and associated server object to access a plurality of features of the respective objects when accessing images on the database.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating storage, access, and version control of PLC-based images. An object is provided that mediates access between a database server and an application that desires access to such images. Before access can be achieved, a login and authentication process for a user desiring access to the image database is performed, wherein users who are successfully authenticated can then save, retrieve, and affect changes to the images in a substantially secure manner while enforcing protection against invalid or improper changes to the images.

The object is adapted to store the images as a complete or compiled version of the elements required to operate a PLC program. For example, the elements can include logic instructions and associated data table files that direct PLC operations and are generally stored as a unitary or inseparable binary image. Thus, merely storing program changes to previously stored images in the database that have been altered as is conventional will not enable suitable reconstruction of the image when downloaded to the PLC. Since PLC images are different than standard data types that are typically stored, a check-sum procedure is performed on the image to determine if changes are made. If changes are made, a more recent version of the image can be stored and a metadata file that is associated with the image can log relevant change information (e.g., who, when changes made) and bump an associated revision information for the image thus facilitating automated an orderly control over who, how, when, and where such revisions are made.

Figure 1:
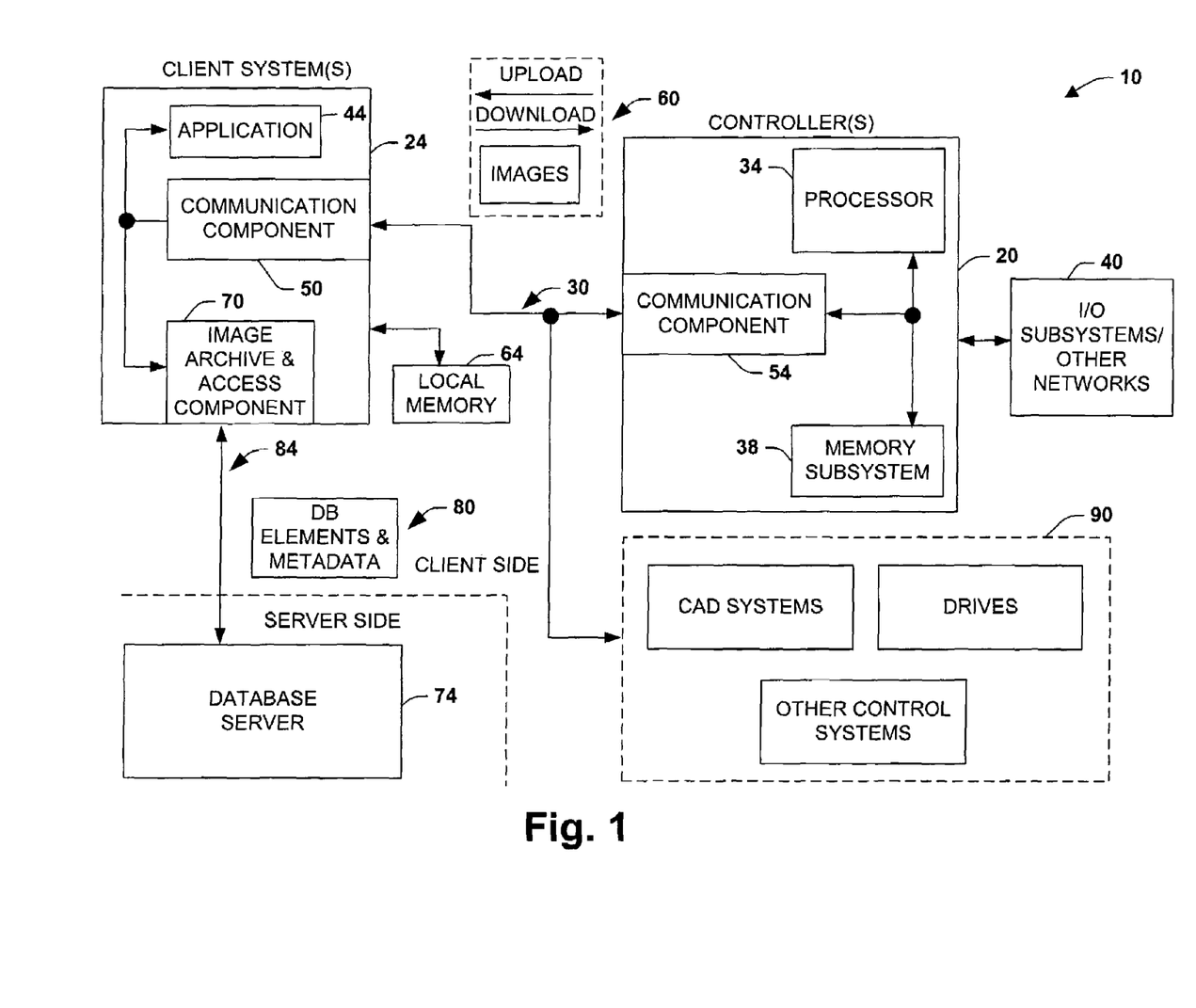
FIG. 1 is a schematic block diagram illustrating an industrial controller and image warehouse architecture in accordance with an aspect of the present invention.

Referring initially to FIG. 1, an industrial control and image warehousing system 10 is illustrated in accordance with an aspect of the present invention. The system 10 includes an industrial controller 20 communicating to one or more client systems 24 across a local factory network (e.g., DeviceNet, ControlNet, Ethernet, DH+) and/or a public network 30 such as the Internet. This can also include other communications options such as phone connections and/or wireless connections. A processor 34 (or processors) in the controller 20 executes from an associated memory subsystem 38 that can include an operating system (e.g., Microsoft® Windows® NT/2000/XP, Windows CE, Linux, .NET, OS-9, UNIX, VRTX, QNX, VxWorks, CE.NET, custom-designed). The controller 20 can also communicate to and control various Input/Output subsystems 40 and/or other networks (e.g., Analog, Digital, Programmed/Intelligent I/O modules, other programmable controllers, communications modules, networks).

The client system 24 includes at least one application 44 that interacts with a client communications component 50 (e.g., RSLINX®) to exchange data with the controller via a communications component 54 suitably adapted to transfer information on the network 30. As illustrated, one or more images 60 can be download to and/or uploaded from the controller 20 in response to instructions or commands executed by the application 44. The application 44 can include substantially any type of software for manipulating the images 60 such as an editor tool (e.g., RSLOGIX®) or other applications which are described in more detail below, whereby the images 60 are generally processed on a local memory or storage device 64. This can include such operations as creating, viewing and/or modifying controller programs that describe or constitute the images 60.

In accordance with one aspect of the present invention, an Image Archive and Access (IAA) component 70 is provided to store the images 60 on a server database 74 and retrieve the images therefrom (e.g., commercially available SQL server). As will be described in more detail below, the images 60 are stored as database elements 80 having a binary file describing controller program elements and associated data table files. In addition, metadata is associated with the database elements 80 that describe supervisory aspects of the present invention in order that image manipulation activities are recorded for control and security purposes. Before the database elements 80 which are associated with the image 60 can be retrieved from the database server 74 (or stored therein), a login and authentication procedure is performed via the IAA 70 to determine if a respective user of the application 44 has the authority to access such data.

If the user has logged-on successfully (e.g., entered a suitable pass-phrase) and been authenticated to remove a database file (e.g., tag associated with metadata indicating logged-in user has access rights to file), the user can perform a check-out operation to retrieve the desired database elements 80 from the database 74 and store database elements as a working file (not shown) in the local memory 64. The user can then perform operations such as edits to the working file on the client system 24 (and local memory 64) via associated application 44 and can download the working file to the controller 20 as an image 60 for testing or program operations, if desired.

During the time of check-out, the database elements 80 associated with the working file are tagged as checked-out to prevent other users from also making changes which may cause undesired inconsistencies if multiple changes were to occur concurrently. If desired, the edited working file can be checked-in to the database server 74 for storage. During a check-in, a check-sum (or other difference test such as comparing rungs and data table files) is read or determined from the existing database elements 80 that are associated with the previously stored binary file of the image 60 and compared with a check-sum from a binary file that has been manipulated on the client system 24 as the working file and currently residing in the local memory 64. If the check-sums from the stored binary file at the database 74 and binary file stored at local memory 64 differ, the check-in procedure performed by the IAA component 70 causes an updated file to be loaded in the database 74 having a different revision from the previous file and having associated metadata updates to record the activities such as who edited the file, when was the file edited, and so forth which is described in more detail below at FIG. 3. In addition to check-in and check-out functions, the IAA component 70 facilitates various other image archival and access procedures in accordance with the present invention which are described in more detail below in relation to FIG. 2.

It is noted that the IAA component 70 acts as an intermediary component between the application 44 and the database 40. As such, a separate communications network 84 (or software channel/socket) can exist between the IAA 70 and database 74, if desired. In another aspect, the IAA 70 can communicate through the client communications component 50 and network 30 to transfer information to and from the database 74. In addition, the IAA 70 can be provided as a re-locatable object wherein the object is operated on various or different platforms/applications to achieve access to the database 74. As one example, the IAA 70 can be located and/or operated in the memory subsystem 38 of the controller 20.

In another aspect of the present invention, the images 60 can be generated by and/or operated upon via one or more auxiliary control systems or control support systems illustrated at reference numeral 90. For example, the systems at 90 which can also have images 60 stored and retrieved from the database 74 include CAD systems, drives, and/or other control systems such as robotic systems or advance manufacturing cells.

Figure 2:
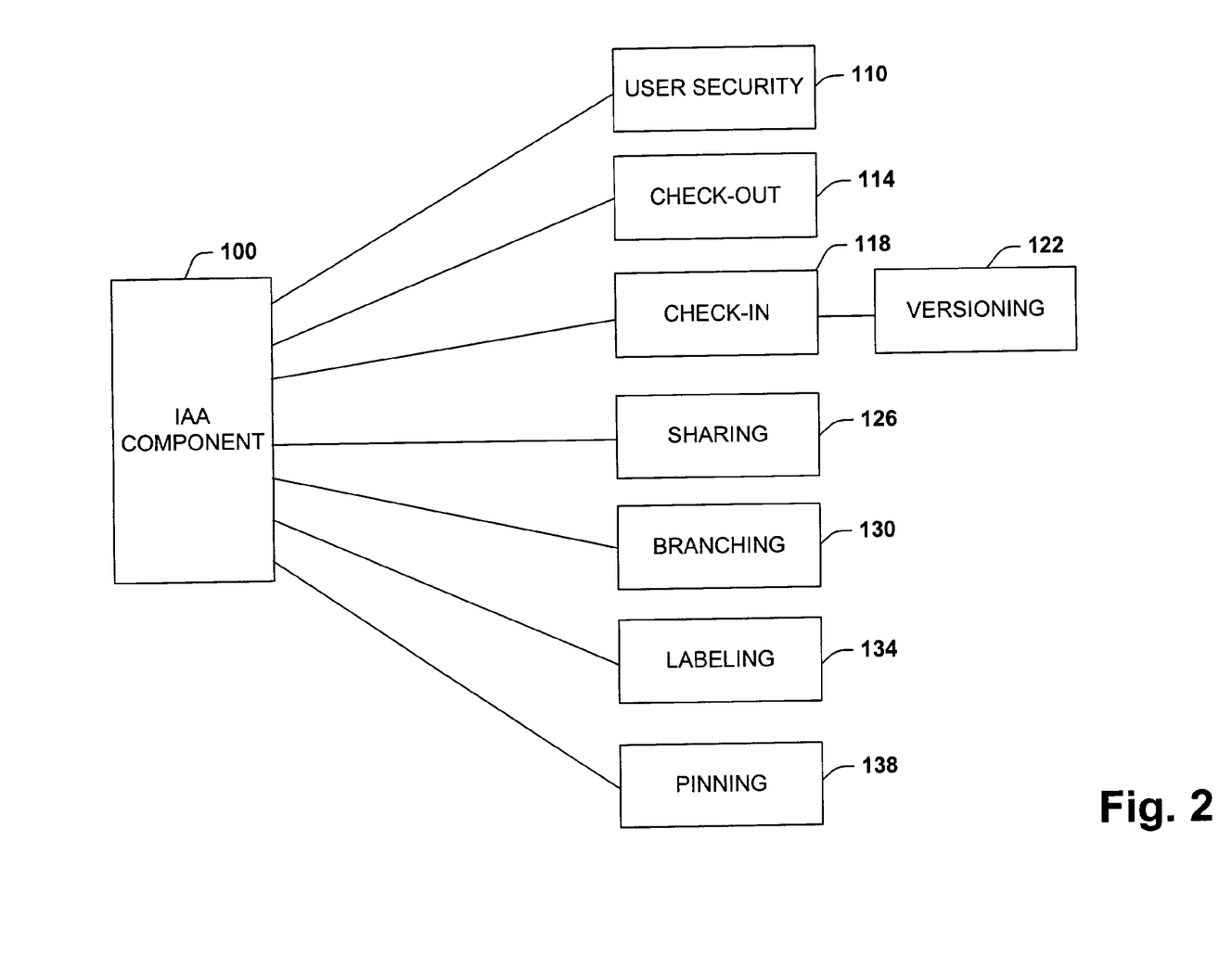
FIG. 2 is a schematic block diagram illustrating Image Archive and Access component features in accordance with an aspect of the present invention.

Referring now to FIG. 2, an IAA component 100 and associated image features are illustrated in accordance with an aspect of the present invention. The IAA component 100 provides various features for controlling which users can access images in the database server and what types of procedures can be performed thereon. One such procedure for controlling image access is provided by a user security component 110. As noted above, this procedure or routine 110 provides such security measures as requiring a user to enter a login id and associated password before gaining access to the database server via the IAA 100. Even if access is gained, suitable authentication may be required before image manipulation/retrieval can occur—on all or selected images. For example, elements in a metadata file (described below) may have assigned security codes or authentication data which list or describe the users or user types (e.g., supervisory or administrative users only) who may read and/or update images on the database. The security codes can be mapped to user login id's or be provided to authorized users who then supply the codes to the IAA 100 during an authentication procedure (e.g., user enters authentication information in a field associated with an access interface). The codes can also be automatically supplied from a trusted machine or network of machines after the user has logged-in to the database.

Another component of the IAA 100 is a check-out feature 114. During check-out of an image from the database server, a tag associated with the image is marked to indicate that a respective image is currently in use and preventing other users from similarly checking-out the same image. In this manner, changes to the image can be controlled in a serial manner—thus mitigating inconsistent or conflicting changes to an image by multiple users. A check-in feature 118 is also provided with the IAA 100 to automatically provide a versioning function 122 in accordance with the present invention. When a user desires to store an image on the database server, the check-in feature determines if changes have been made in accordance with a previously stored version of the image. If so, the versioning function 122 automatically updates revision information associated with the image that is to be checked-in and the check-in feature 118 initiates storage of the updated image on the database. The check-in and versioning procedure are described in more detail below in relation to FIG. 4.

Other aspects of the IAA 100 include features for controlling how files are stored, manipulated, and/or retrieved to/from the database server. One such feature includes a sharing feature 126 that marks two or more images (marked or flagged in a tag element described below) as being shared. Images that are marked as such will then receive the same or similar changes from an associated image or images if changes are made to the associated images. Similar to sharing, a branching feature 130 is provided. Branching essentially undoes a sharing operation by resetting or clearing the tag that marks a file as being shared with another file. Thus, after a branching operation occurs on an image, the branched image will then be treated as a singular image and will not again be updated unless the branched image itself is thereby updated.

In yet another aspect of the present invention, a labeling feature 134 and a pinning feature 138 can be provided by the LAA component 100. The labeling feature 134 allows users to assign their own label or code to a respective version revision or number that has been assigned to an image. For example, if an image is assigned a version number as "image.001234", then the user can label this same image as "image.abc" or "user1img.test" and so forth. The label supplied by the user is then mapped to the numerically assigned or coded version number that has been automatically assigned by the versioning function 122 described above.

The pinning feature 138 facilitates tagging a respective version of an image as the latest revision. As an example, if version 6 of an image is pinned, and if image versions 7 and 8 have been created from version 6, then during check-out of the latest or current revision of an image, pinned version 6 will be retrieved from the database server in lieu of later revisions that may exist. Pinning facilitates a conservative approach to modifying existing images that may have been in operation for many years. Rather than risk loading an incorrect or experimental image on a controller, pinning provides a tested baseline of code that will be retrieved from the database when the current revision is requested even though other more recent versions may exist.

Figure 3:
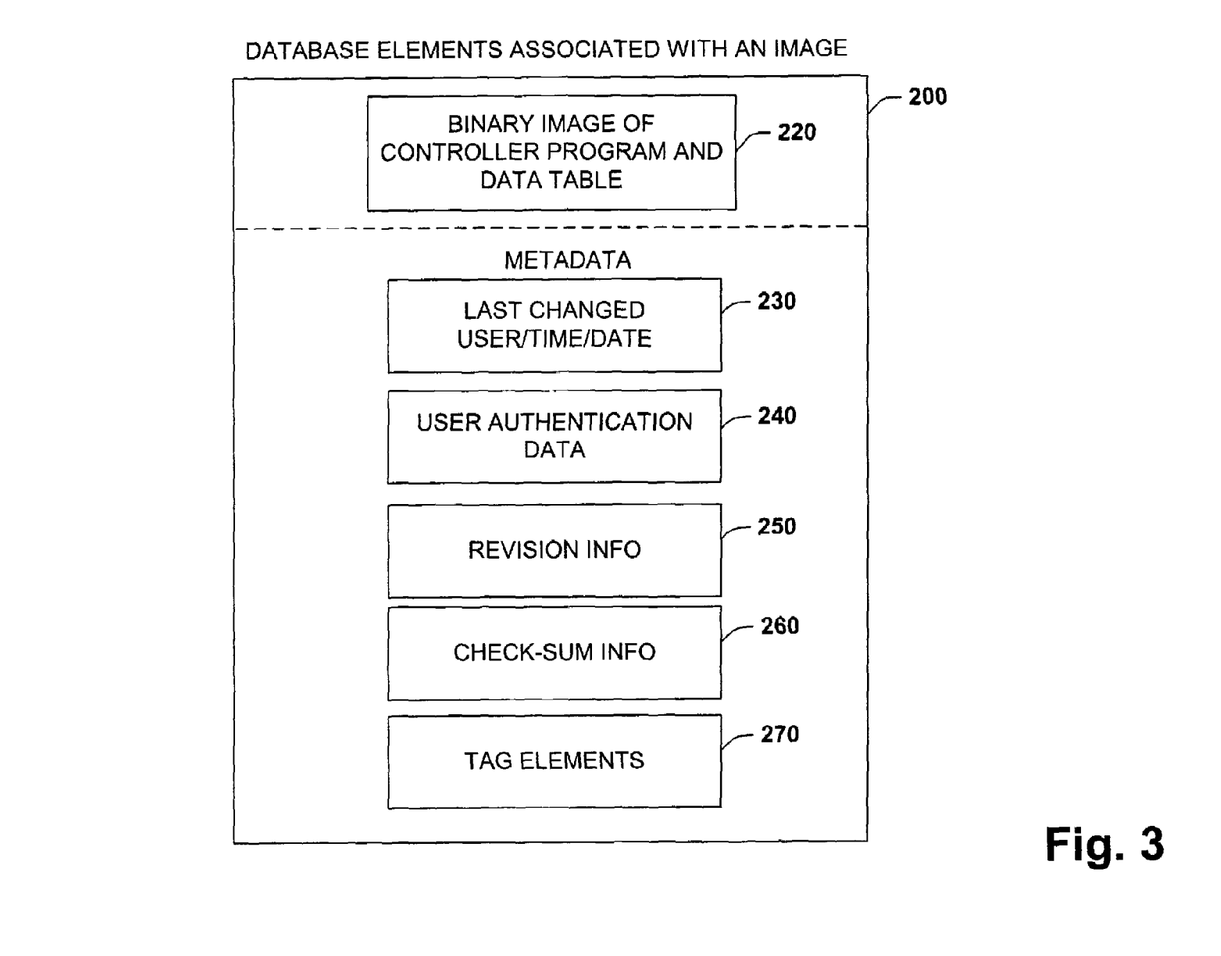
FIG. 3 is a schematic block diagram illustrating an image and associated metadata in accordance with an aspect of the present invention.

Turning now to FIG. 3, an image database file 200 having associated elements is illustrated in accordance with an aspect of the present invention. The database file 200 includes a binary image 220 which may be an element stored as a contiguous blob (binary large object). As noted above, the image 200 can be stored on a Structured Query Language (SQL) database or other commercially available server. The binary image 220 is compiled or derived from programmable controller logic instructions and associated data table files (e.g., timers, counters, floats, integers, bits, status, I/O bits, and so forth). In addition to the binary image 220, various metadata elements are also stored with the database file 200. At 230, information is stored regarding when an image was modified such as time/date information and information relating to the user who performed the changes. At 240, user authentication data can be provided. As described above, the data at 240 can include confirmation codes or security flags that indicate users rights to access the image 200. At 250, revision information can be stored relating to the current version of the file 200. Additional elements at 250 can also include label information thus providing a mapping between system assigned values and user assigned names. At 260, check-sum information can be stored indicating the current check-sum of the binary image at 220. Other elements in the file 200 can include one or more tag elements 270 that can be employed to mark or flag various states of the file such as checked-out, shared, shared image reference tags to other images, pinned, pin version number, and other data as can be appreciated.

Figure 4:
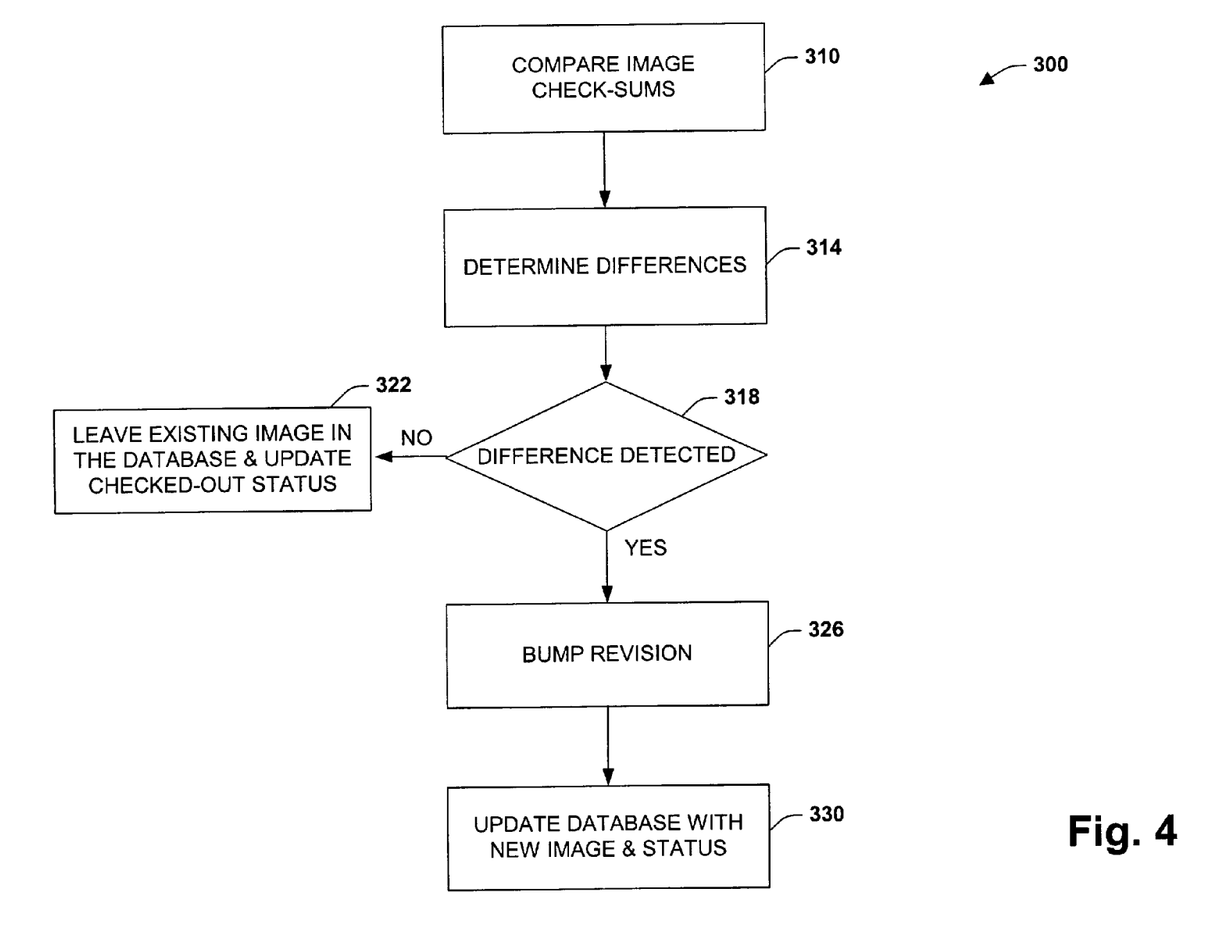
FIG. 4 is a flow diagram illustrating an image versioning and storage process in accordance with an aspect of the present invention.

FIG. 4 illustrates an image versioning and storage methodology 300 in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 4, and proceeding to 310, the beginning of an image check-in procedure is performed. At 310, check-sums of a currently checked-out image are compared with a stored check-sum of the image before check-out. At 314, a determination is made as to whether there are any differences between the checked-out images and the previously stored version of the checked-out image. If no differences are detected at 318, the process ends at 322, wherein the existing image is left in the database and an associated tag of the existing image is updated in the database to indicate that the existing image is now checked-in. If differences are detected at 318, the process proceeds to 326, wherein a revision field associated with the currently modified image is bumped or changed to indicate a newer or more recent version of the previous image now exists in the database. At 330, the database is updated with the modified version of the previous version of the image and also updating a tag indicating that the new revision has been checked-in. As an alternative to the procedure described above at 330, whereby newly modified files are added to the database, settings can be provided to enable older revisions to be automatically removed from the database immediately, at some time in the future, or to remove a specified amount of files such as to only remove a file if it is at least three (or other specified number) revisions removed from the current revision.

Figure 5:
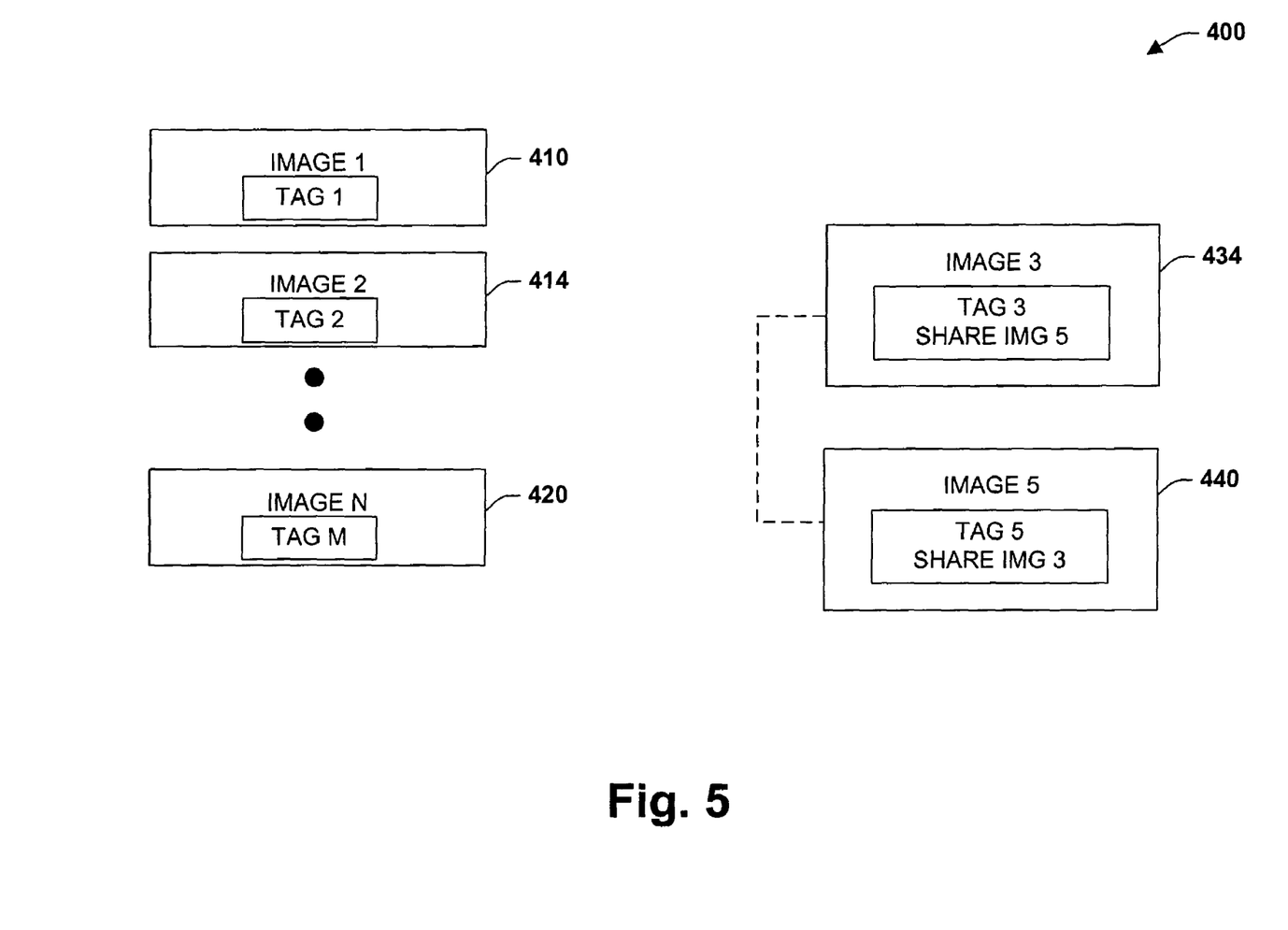
FIG. 5 is a diagram illustrating a sharing operation in accordance with an aspect of the present invention.

Referring now to FIG. 5, a diagram 400 illustrates image sharing in accordance with an aspect of the present invention. One to N images are illustrated at 410–420, wherein respective images are associated with a tag (or tags) illustrated as tags 1 through M, N and M being integers respectively. At 434 and 440, two exemplary images are illustrated as $image_3$ and $image_5$ having associated tags—$tag_3$ and $tag_5$ respectively. In accordance with a sharing operation $tag_3$ has been marked or updated to indicate that another file (or files) has been marked as shared with $image_3$. In the example illustrated in FIG. 5, $tag_3$ is marked to indicate that $image_3$ is shared with $image_5$. Similarly, $image_5$ is marked via $tag_5$ to indicate sharing with $image_3$. Thus, if $image_5$ were to be checked-out of the database, for example, and an edit or change were to be performed thereon, the edit or change would also be applied to $image_3$ as indicated by $tag_5$ which denotes a sharing with $image_3$. As noted above, sharing can be removed by performing a branch operation to indicate the images are no longer to be treated as shared files. In this example, if a branch operation were to be performed on either $image_3$ or $image_5$, both $tag_3$ and $tag_5$ would be updated (e.g., clear pointer) to indicate no other image is currently being shared. It is noted that if multiple files were being shared, a branch operation could remove one or more of the files from the shared group by updating the respective tags, yet, still leave other members of the shared group intact.

Figure 6:
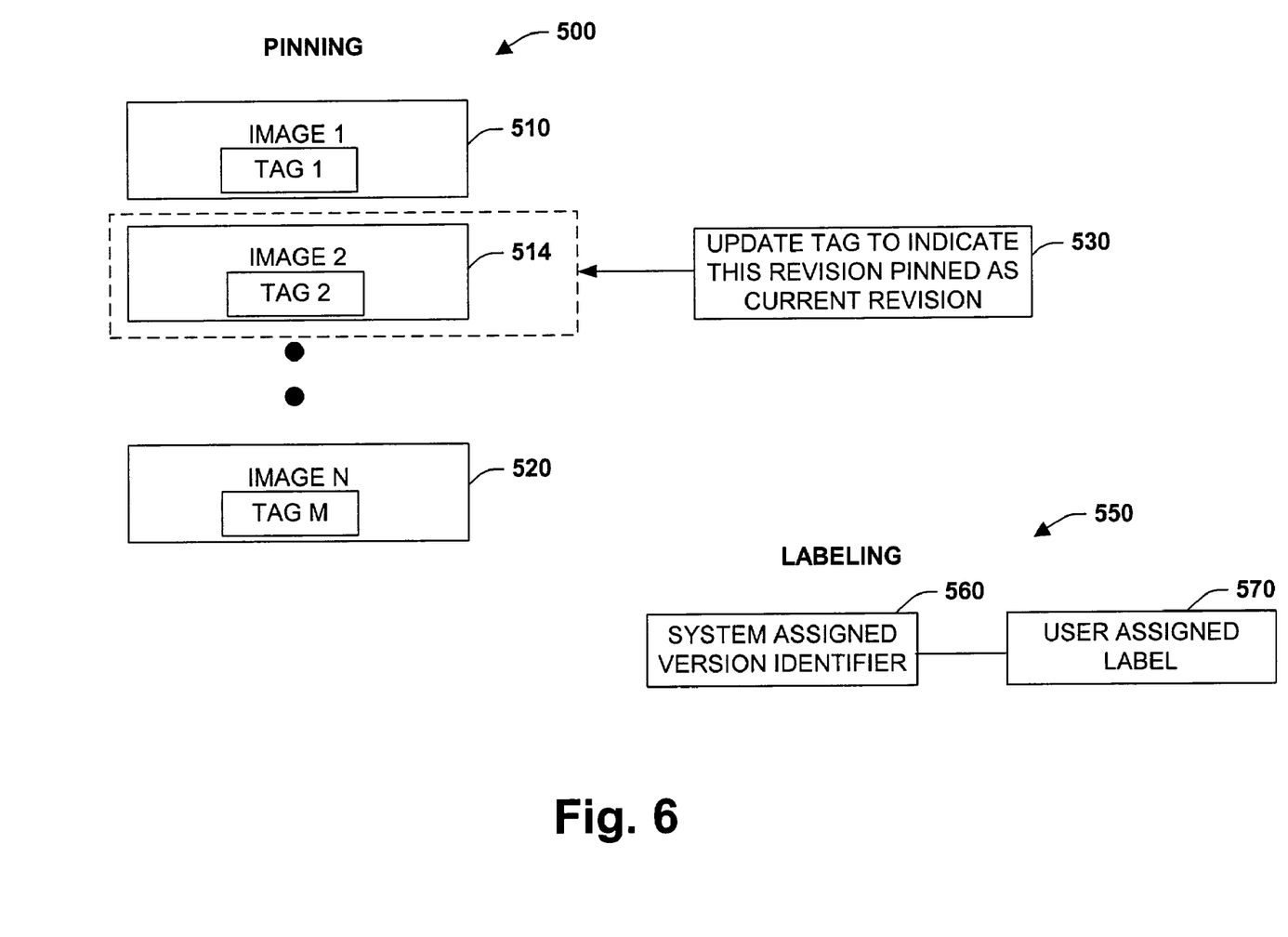
FIG. 6 is a diagram illustrating pinning and labeling operations in accordance with an aspect of the present invention.

FIG. 6 is a diagram illustrating pinning and labeling operations in accordance with an aspect of the present invention. At 500, images 510–520 are illustrated, whereby one of the images is pinned to indicate the current revision in the database. In this example, $image_2$ having associated $tag_2$ is updated at 530 to indicate via $tag_2$ that $image_2$ is the current revision. Thus, if later revisions of $image_2$ (e.g., image revisions 3 through 8) were to be created on the database, image$_2$ would be returned when the most current image revision was requested or retrieved from the database. As can be appreciated, an image can be un-pinned by clearing or updating the respective tag. At 550, a labeling operation is illustrated. At 560, a system assigned identifier or code is associated with an image during check-in of the image to the database. If desired, users can assign a user-designated label at 570 (e.g., characters, numbers, codes) that can be employed when accessing or manipulating the respective image. As noted above, an associated image metadata file can record the user assigned label thus, providing a mapping between the system assigned version identifier at 560 and the user-designated label at 570.

Figure 7:
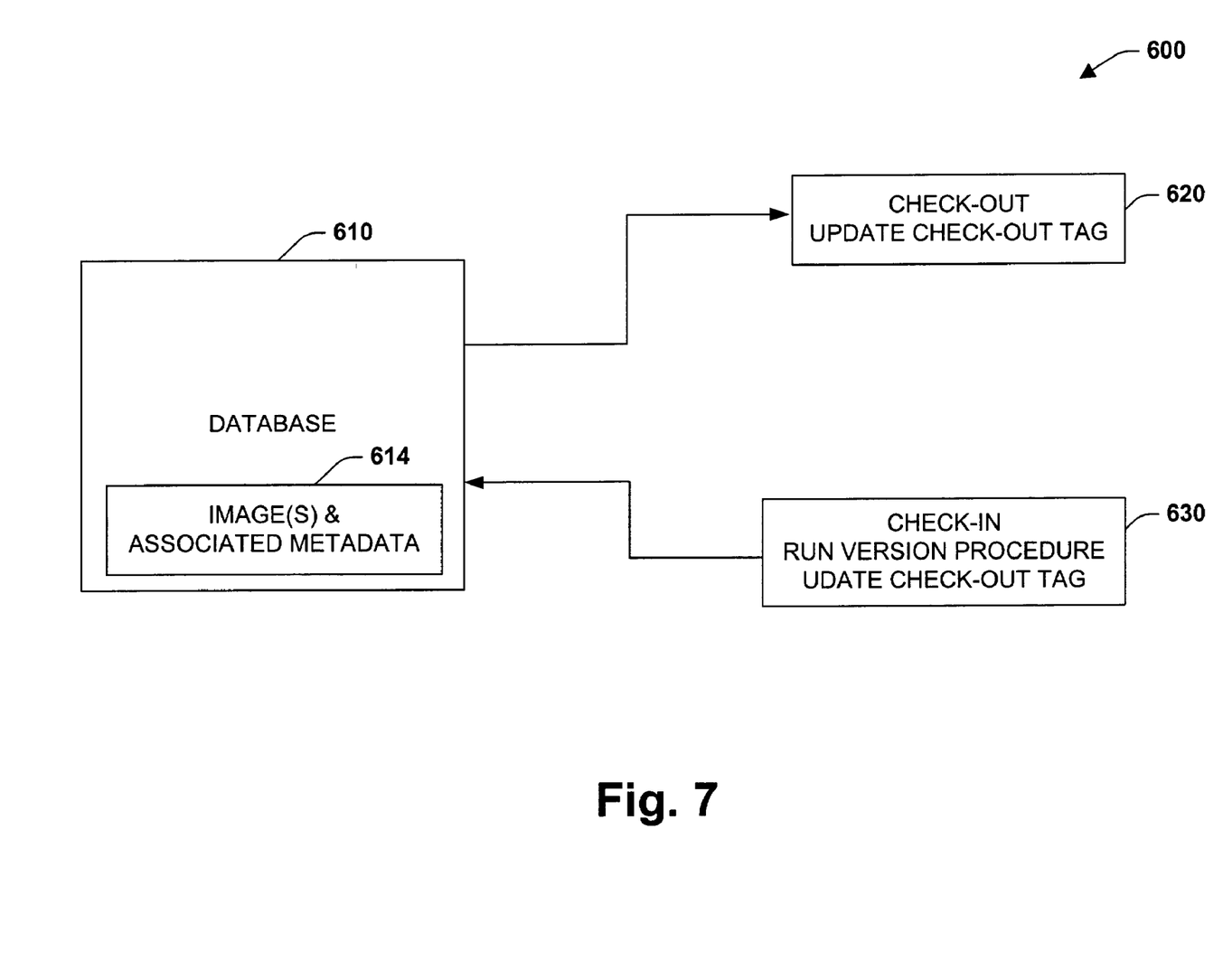
FIG. 7 is a diagram illustrating tag manipulations during check-in and check-out operations in accordance with an aspect of the present invention.

Referring to FIG. 7, a diagram 600 illustrates tag updates during database activities in accordance with an aspect of the present invention. A database 610 such as an SQL database as noted above stores one or more images 614 having associated metadata. At 620, an image is checked-out from the database 610, wherein a tag or flag in the image metadata is updated on the database to indicate that the respective image has been checked-out (e.g., tag or flag set in database to indicate image is in-use). Thus, if another application were to attempt to check-out the same image from the database 610, the image would be prevented from being retrieved from the database (e.g., prevented via the IAA component described above) since the associated tag has been previously marked as checked-out. At 630, when the image that has been previously checked-out is returned to the database 610, a check-in procedure can be performed as previously described in relation to FIG. 3. If the image has been altered, the check-in updates the revision of the respective image, stores the new version of the image on the database, and updates the check-out flag or tag to indicate the image is no longer in-use. If no changes have been made to the respective image, the check-out tag is cleared or updated to indicate that the image is no longer in-use, however, the existing version of the image remains on the database 610.

Figure 8:
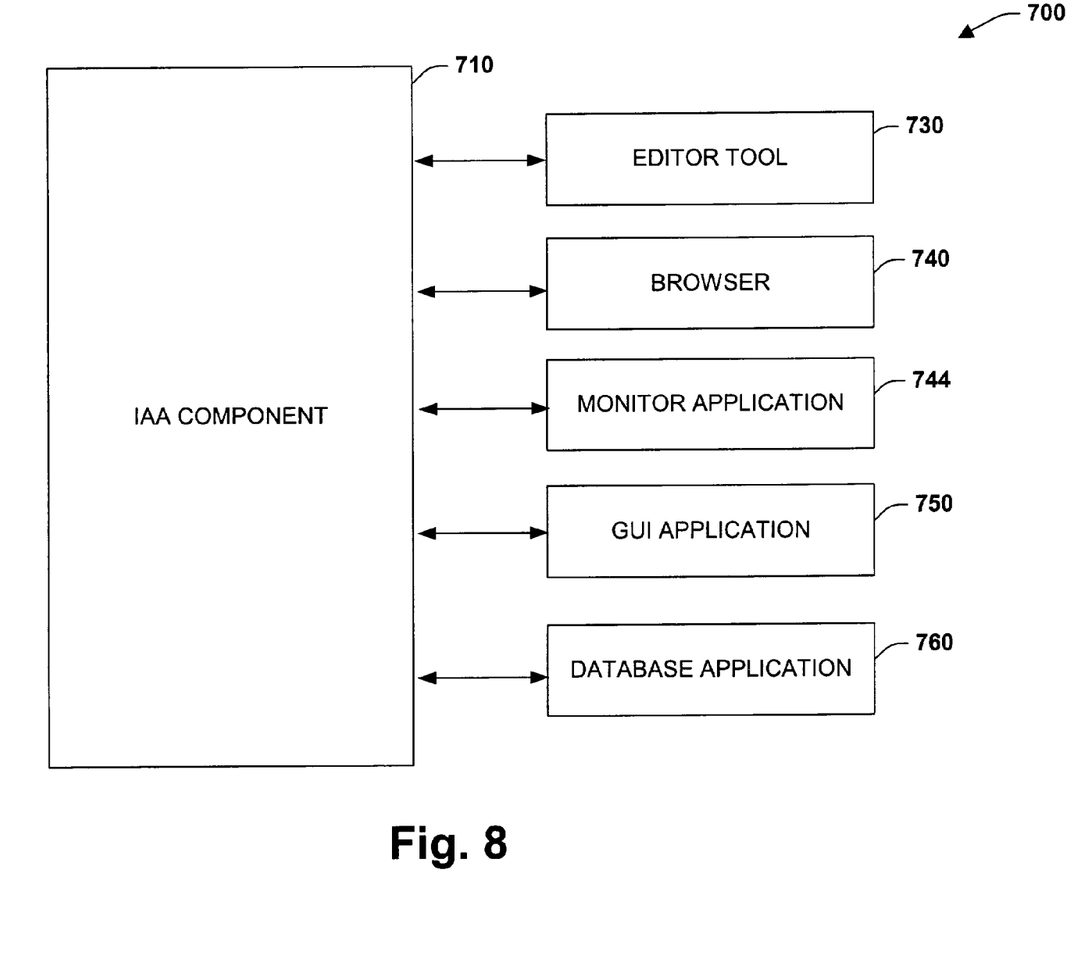
FIG. 8 is a block diagram illustrating image applications in accordance with an aspect of the present invention.

FIG. 8 is a diagram 700 illustrating various applications that can be employed with an IAA component 710 in accordance with an aspect of the present invention. As noted above, the IAA component 710 is employed to control image access to a database server. In conjunction with the IAA 710, various applications can be utilized. As described above, an editor tool 730 can be provided to retrieve, view, and/or modify one or more images. Such tools can be provided as PLC program editors, wherein program variables and/or logic instructions are added, removed, and/or modified on a client machine (or server) that operates such editing application. Another type application that can be utilized with the IAA 710 is a browser application 740. The browser 740 can be employed from a remote location such as a remote client system operating across the Internet, for example. It is noted that substantially any application can operate with the IAA 710 to access/modify images, wherein the IAA and associated application operates on the same machine or alternatively, these components operate on separate machines. For example, the IAA 710 could be operating on a client machine that communicates to a database server and the browser 740 accesses the client machine from an Internet browser before gaining access to the database server via the client machine.

At 744, a monitor or other type communications application 744 can be provided. Such applications can be in communication with a PLC for example, and monitor for status or maintenance type of activities. If a problem is detected with the PLC, images may be accessed from the database automatically and/or manually to provide assistance in diagnosing or troubleshooting the PLC. For example, diagnostic images may be retrieved from the database and subsequently loaded on the PLC in order to determine a potential problem or place the PLC in a desired troubleshooting state in order that further diagnosis can occur. In addition, if a problem or other type of status event is detected on the PLC, the monitor application 744 can store an image of the PLC on the database at about the time the event occurred. The stored image can then be retrieved and inspected to determine possible causes relating to the detected event.

At 750, a Graphical User Interface (GUI) application may be provided. This can include substantially any type of application that sends, retrieves, and/or manipulates images in accordance with client side interfaces presented in graphical form to a user. For example, such interfaces can be employed with the applications previously described such as an editor tool or browser although other type applications can be utilized. The GUI 750 can provide one or more display objects (not shown) including such aspects as configurable icons, buttons, sliders, input boxes, selection options, menus, tabs and so forth having multiple configurable dimensions, shapes, colors, text, data and sounds to facilitate operations with the images, database server and/or client system. In addition, the GUI 750 can also include a plurality of other inputs or controls for adjusting and configuring one or more aspects of the present invention. This can include receiving user commands from a mouse, keyboard, speech input, web site, remote web service and/or other device such as a camera or video input to affect or modify operations of the interface 750.

Proceeding to 760, a database application can be provided in accordance with the present invention. Database applications 760 can include substantially any type application that can store, retrieve, and/or manipulate images on the database server according to one or more of the concepts previously described (e.g., check-in, check-out, editing, downloading, uploading, renaming, sharing, branching and so forth).

Figure 9:
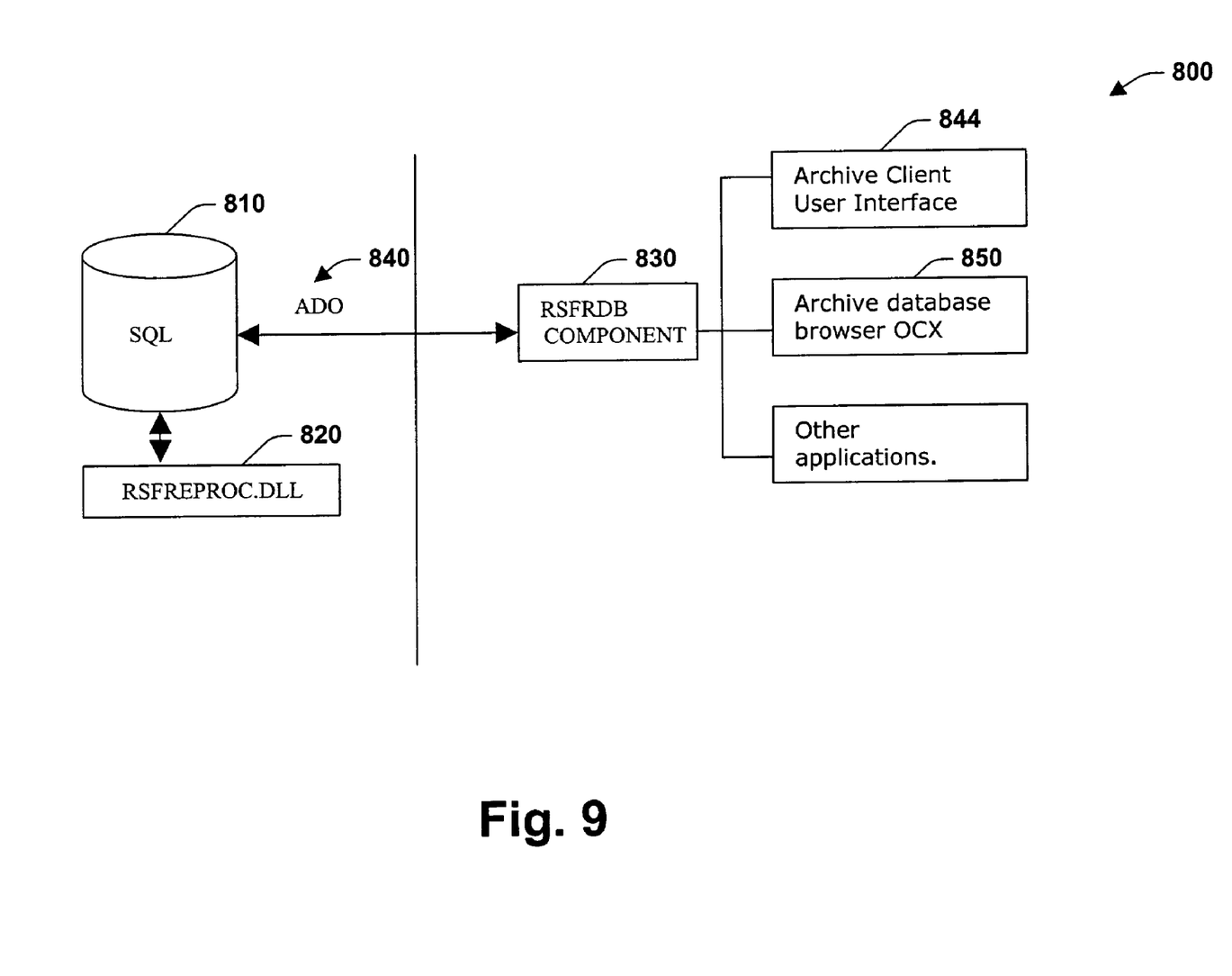
FIG. 9 is a diagram illustrating database objects in accordance with the present invention.
Figure 10:
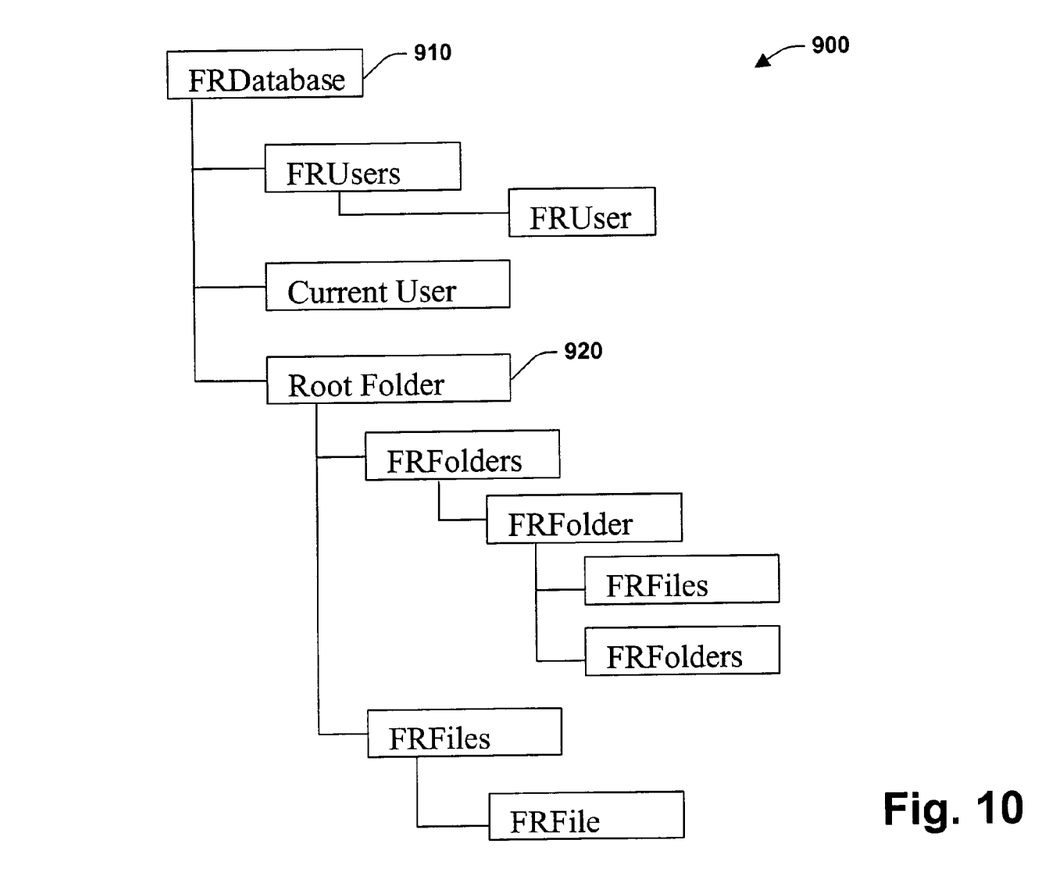
FIG. 10 is a diagram illustrating a database structure in accordance with the present invention.

FIGS. 9 and 10 illustrate exemplary implementations of the present invention that can be employed with the database concepts, file management, and objects or components previously described. These components can be provided as part of an Archive Module or system that is a SQL Server based repository of files and projects with support for archiving and version control. Users can store and maintain archives of their files such as RSLogix files, Document files, and so forth in a hierarchical 'Folder/File' paradigm. The present invention supports all types of file formats. The system offers 'Folder' level security for stored files, wherein a detailed log of activities for a file/folder are maintained. Whenever a user performs an action on a file, such as Check-In, Check-Out, Rename, etc., a log entry is maintained indicating who did what and when to the file/folder. Some of the components described can be provided as part of commercially available systems such as for example:

Server Operating Systems
    Windows 2000 Professional or Server Client Operating Systems
    Windows 2000 Professional or Server
    WindowsNT 4.0 SP 6
    WindowsXP Networking Support TCP/IP based Windows Domain Network can be provided for multiple client computers support. For single workstation, it is not essential.

Database Server

Microsoft (or other vendor) SQL Server 2000 Standard or Enterprise

FIG. 9 illustrates an Archive Module system 800 which provides a multi-user solution based on an SQL Server 2000 backend database. A server 810 includes a Microsoft SQL Server 2000, for example, and a RSFREPROC.DLL 820. This DLL may be employed by some of the stored procedures of the database (e.g., storing images with associated metadata). The basic Client/Server relationships and layout are illustrated by the system 800, although as noted above, other arrangements are possible (e.g., client object operating from various locations/machines)

The system 800 includes a database client component 830 (e.g., RSFRDB.DLL) and connects to the server 810 employing ActiveX Data Objects 840 (e.g., ADO Version 2.6 or higher, or other communications object) and utilizes a native SQL OLE DB driver. One or more user level interfaces such as an Archive Client 844, and Archive Browser OCX 850 utilize the data access DLL 830 to interact with the repository 810 and its objects.

The RSFREPROC.DLL 820 (extended procedures dll) contains procedures that the database stored procedures employ to interact with an operating system, wherein the built-in SQL facilities cannot fulfill the needs (e.g., handling of binary images). The database 810 can be created via a utility that creates the specified database and all the required database objects.

The RSFRDB.DLL 830 component operates as an IAA component described above. This is the core client side component of the Archive system. All database interactions should be routed through this component. Thus, client applications should not call database procedures or alter tables directly. The component 830 can be provided as an ActiveX component operating as an object model to interact with database objects. This component supports IDispatch and custom interfaces, for example (e.g., Dual Interfaced) Client applications can use either type interface (or other types), if desired.

The client user interface 844 is a fully functional default client interface for end users. This user interface is an ActiveX document that client applications host. This interface 844 can be employed by the user to manage folders, view activity logs and so forth. The browser OCX 850 includes ActiveX control and is provided for applications integrating into the Archive system services. It provides a familiar 'Windows File Open Dialog' like interface that can be used for browsing the database 810.

The system 800 employs various security aspects. In general, there are two parts to database security. In one aspect, 'Who' has access to the SQL Server and database 810. Second, what folders can that user access and use. All users who need to access the system can be added to the SQL Server/Database 810 using an Archive Administration Utility (e.g., MMC Snap in). These users generally must be Windows Domain users—native SQL logins are not supported. The system 800 also supports domain groups. Once added to the system, these users have either Archive Module Admin or regular user rights.

Admin users can add/remove users and modify folder rights. Folder rights describe/permit 'what' level of access a user has to a particular folder object and its contents. For example, the following lists exemplary rights that can apply to a folder object:

| Rights | Description |
| --- | --- |
| None | No rights defined. User cannot do anything to the folder. |
| Read | User has read only access to folder and its contents. |
| Check In/ Check out | User can check in or out the folder or its contents. |
| Add | User can add files and folders to the folder. |
| Destroy | User can permanently destroy the folder or its contents. |
| Inherited | User's rights to this folder are inherited from the folders parent folder. This is not applicable to the root 'File Repository' folder. |

Folder rights can be set by the administrator user by using the Admin Utility MMC snap in or the Archive client user interface 844. Method calls that rely upon user having correct rights will return E_ACCESSDENIED error if a rights check fails.

The basic object model for the client component 830 is illustrated at 900 of FIG. 10. A top-level object is FRDatabase at 910. This object is the root object that is generally instantiated first. Using this object 910, enables traversing down a Folders/Files hierarchy tree illustrated at 900. The database object generally contains a 'Root Folder' object at 820 that is available provided the database has been installed correctly. This folder's name is 'File Repository' and has an ID of '00000000-0000-0000-0000-000000000000'. Respective objects (File or folder) in the database is identified by a GUID (Globally Unique ID) and is unique for each object. There is typically no limit imposed on how many files or folders that can be contained in the database. It is dependant on external parameters like memory, disk space etc. of the server and the client computers.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for archiving industrial controller images, comprising:
    determining differences between a stored industrial controller image on a SQL database and a checked out image on a client system;
    determining differences by comparing check-sums between the stored image and the checked out image;
    storing the checked out image as a later revision on the SQL database if differences exist between the stored image and the checked out image, the image is stored as a complete and compiled version of elements required to operate a PLC program, the elements include logic instructions and associated data table files that direct PLC operations; and
    tagging the stored image in accordance with who manipulated a prior image and when the stored image was last manipulated.

2. The method of claim 1, further comprising storing an image on the SQL database as a combination of a binary image that describes a programmable controller and a metadata file that is associated with the binary image.

3. The method of claim 1, further comprising:
tagging the image as checked out when in use; and
clearing a checkout tag when the image is checked in to the SQL database.

4. The method of claim 1, further comprising providing at least one of a sharing, branching, labeling and pinning operation with the stored image.

5. The method of claim 1, further comprising increasing a revision on the checked out image if differences are determined.

6. The method of claim 1, further comprising assigning access rights to the stored image, the access rights control who can access the SQL database and what folders or files may be accessed therein.

7. The method of claim 6, the access rights further comprise at least one of none, read, check in, check out, add, destroy, and inherited.

8. An industrial control system, comprising:
an archive component that manages revisions of one or more controller images; and
an SQL database that stores and permits access to the one or more controller images, the access provided by way of the archive component, the one or more controller images are stored as a complete and compiled version of elements required to operate a PLC program;
the archive component mediates access to the SQL database and determines the revisions based upon differences of a retrieved image as compared to a previously stored image in the SQL database, the archive component further comprising a check-in feature to automatically provide a versioning function to manage the revisions, and
the archive component further comprising a sharing feature that marks two or more images as being shared, images that are marked as shared receive changes from an associated image if changes are made to the associated image, and a branching feature to remove shared status from the two or more images.

9. The system of claim 8, the archive component determines the differences by comparing check-sums of the retrieved image to a check-sum associated with the previously stored image.

10. The system of claim 9, the archive component stores a new image on the SQL database, the new image associated with a different revision from the previously stored image if differences are detected.

11. The system of claim 8, further comprising a controller that at least one of uploads and downloads the controller images, the archive component and the SQL database communicate by way of at least one of a local factory network and a public network.

12. The system of claim 11, the local factory network includes at least one of DeviceNet, ControlNet, Ethernet, and DH+ and the public network includes the Internet.

13. The system of claim 8, the one or more controller images are stored as database elements having a binary file describing controller program elements and associated data table files.

14. The system of claim 13, further comprising metadata that is associated with the database elements that describe supervisory aspects in order that image manipulation activities are recorded for control and security purposes.

15. The system of claim 8, the archive component is provided as a re-locatable object, wherein the object is operated on various platforms to achieve access to the SQL database.

16. The system of claim 15, the archive component is operated in a memory subsystem of an industrial controller.

17. The system of claim 8, the one or more controller images further comprise at least one of a CAD system image, a drives image, a robotic systems image, and an advanced manufacturing cell image.

18. The system of claim 8, the archive component further comprising a user security component that receives at least one of a login id and password before gaining access to the SQL database.

19. The system of claim 18, the user security component further comprising an authentication procedure to determine rights to access at least one selected controller image.

20. The system of claim 8, the archive component further comprising a checkout feature of an image from the SQL database, wherein a tag associated with the image is marked to indicate that a respective image is currently in use and preventing other users from similarly checking-out the same image.

21. The system of claim 8, further comprising a labeling feature that allows users to assign one or more of their own label and code to a code that has been previously assigned to an image.

22. The system of claim 8, further comprising a pinning feature that marks a lower revision of an image as the current image.

23. The system of claim 8, the archive component cooperates with at least one application, the application comprising at least one of an editor tool, a browser application, a monitor application, a Graphical User Interface (GUI) application and a database application.

24. A data warehousing system for an industrial controller, comprising:
means for accessing an SQL database;
means for archiving controller images on the SQL database, the controller images are archived as a complete and compiled version of elements required to operate a PLC program, the elements include logic instructions and associated data table files that direct PLC operations;
means for generating metadata for the controller images;
means for controlling access to controller images via the metadata;
means for determining differences by comparing check-sums between the controller image and a checked out image;
means for storing check-sum information of the controller image, if differences exist between the controller image and the checked out image; and
means for tagging the controller images in accordance with who manipulated a prior image and when the controller image was last manipulated.

25. The system of claim 24, further comprising means for determining and generating revisions for the controller images.

26. A data warehousing system for an industrial controller, comprising:
a client component that communicates to an industrial controller to upload and download at least one binary image from the controller; and
an SQL server that stores at least one binary image in conjunction with associated metadata that is generated by the client component, the at least one binary image is stored as a unitary and inseparable binary image;

the client component stores a newer revision of the binary image on the SQL server if differences have occurred in the binary image from a previous version of the binary image, the client component also stores check-sum information of the binary image, and the client component further comprises a sharing feature that marks two or more images as being shared, images that are marked as shared receive changes from an associated image if changes are made to the associated image, and a branching feature to remove shared status from the two or more images.

27. The system of claim 26, further comprising multiple industrial controllers that interact with the client component.

* * * * *